United States Patent Office 3,049,357
Patented Aug. 14, 1962

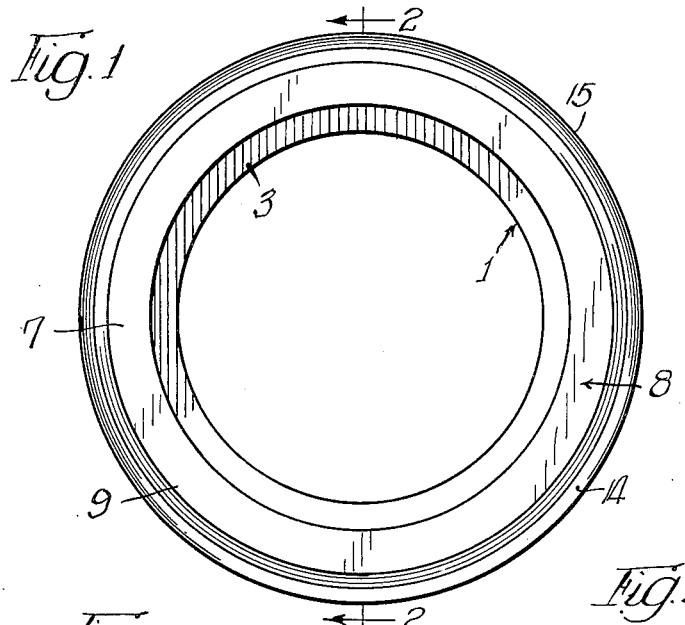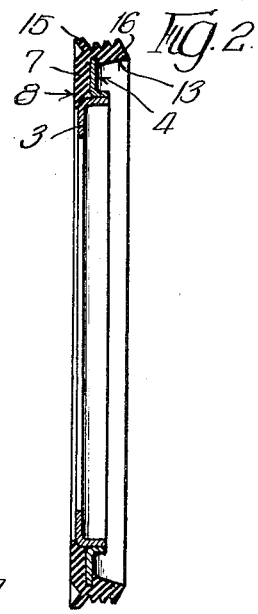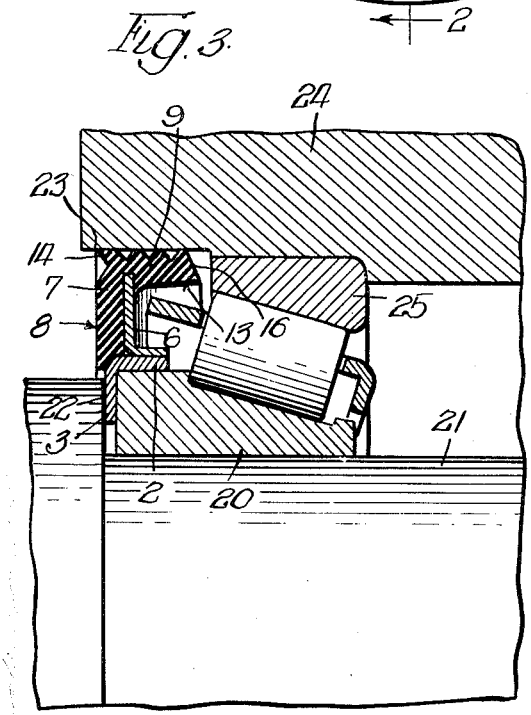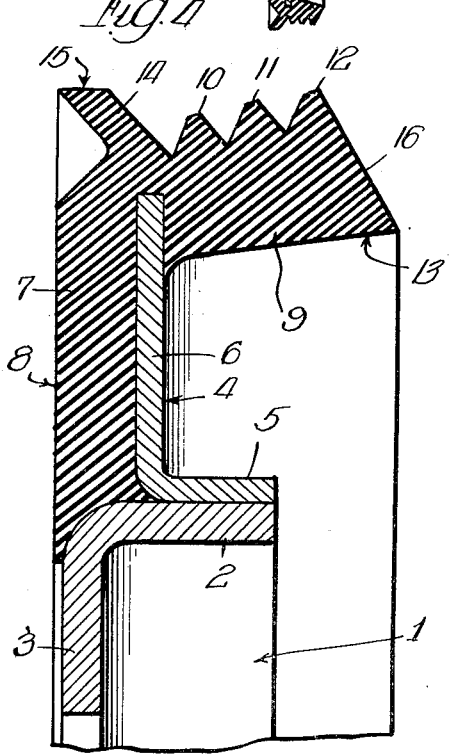
INVENTOR.
Thomas O. Kosatka,
BY George H. Simmons
atty.

3,049,357
FLUID SEAL
Thomas O. Kosatka, Chicago, Ill., assignor to Victor Manufacturing & Gasket Company, Chicago, Ill., a corporation of Illinois
Filed Nov. 10, 1958, Ser. No. 773,002
1 Claim. (Cl. 277—183)

This invention relates to a device for forming a fluid tight seal between relatively rotatable machine parts and has for its principal object the provision of a new and improved device of this type.

It is a main object of the invention to provide a sealing device adapted to be mounted upon the inner cone of a roller bearing and to form a seal with a bore in an outer member with which the outer cone of the bearing is registered.

Another object of the invention is to provide a sealing device composed of an elastomeric material reinforced with metal which prevents blowout of the seal under adverse conditions.

Another object of the invention is to provide a sealing device having a plurality of sealing lips adapted to sealingly engage a machine part, which lips are spaced apart to form grooves in which a lubricant may be placed to reduce friction and to increase the life of the device.

Another object of the invention is to provide a sealing device which, in addition to having sealing lips for containing lubricant, has another sealing lip for preventing entrance of extraneous matter into the seal thus formed.

Another object of the invention is to provide a sealing device adapted to fit upon and be supported by the inner cone of a roller bearing, which device occupies a minimum of space axially of the cone and machine parts with which it is used.

Further objects of the invention not specifically mentioned here will be apparent from the detailed description and claims which follow, reference being had to the accompanying drawings in which a preferred embodiment of the invention is shown by way of example and in which:

FIG. 1 is a plan view of the device;

FIG. 2 is a cross sectional view taken along the line 2—2 of FIG. 1, looking in the direction of the arrows;

FIG. 3 is a fragmentary view in cross section showing a typical installation of the device; and FIG. 4 is a fragmentary cross sectional view of the device drawn to an enlarged scale.

Roller bearings are frequently used to support one relatively rotatable machine part upon a companion part. Thus, for example, such bearings are commonly used to support a rotatable hub upon a stationary shaft or axle. In such an installation two bearings are used and the space between them equipped with a fitting through which the space may be filled with grease or other lubricant. In order to prevent loss of the lubricant from this space, seals are provided.

In the prior art of which I am aware, roller bearings are sometimes equipped with a sealing device carried upon the inner cone of the bearing and having a sealing lip that engages the edge of the outer cone of the bearing to form a seal therewith. It is to such a sealing device that the present invention particularly relates.

In its preferred form, the device of the present invention consists of an inner metallic member dimensioned for press fit upon the inner cone of a roller bearing and elastomer sealing means bonded to such metal member and projecting radially outwardly therefrom. The elastomer element terminates in a generally cylindrical outer portion on the outer surface of which are a plurality of sealing lips which are spaced apart to form grooves into which a lubricant can be placed. These sealing lips engage the bore in the outer machine member adjacent the outer cone of the bearing which fits in that bore.

The sealing device of the present invention, in addition to the plurality of sealing lips for retaining lubricant, is also provided with an outwardly extending sealing lip through which the entrance of dirt and other extraneous matter is prevented.

The sealing device of the present invention is press-fitted onto the inner cone of the roller bearing prior to the registration of that bearing with the machine parts with which it is to work. Through this arrangement the bearing and seal may be handled as a single unit, with the result that the likelihod of damage to the sealing device during assembly of the machine parts is minimized. The sealing device of the present invention requires little room axially of the machine parts, enabling it to be fitted into the small space oftentimes existing between such parts.

The invention will be best understood by reference to the accompanying drawings from which it will be seen that the sealing device consists of a metal ring 1 having a cylindrical portion 2, from one end of which an annular portion 3 extends radially inwardly. The inner diameter of the cylindrical portion 2 of this ring is dimensioned for press fit upon the inner cone of a roller bearing. Attached to this metallic ring 1 is a second metallic ring 4, consisting of a cylindrical portion 5 that is press-fitted upon the outer surface of the cylindrical portion 2 of the ring 1 and welded thereto in any preferred manner, such as by a Bundy weld. The ring 4 contains an annular portion 6 that extends radially outwardly from the cylindrical portion 2 of the first ring. It will be noted that the cylindrical portion 5 of the ring 4 is shorter than the cylindrical portion 2, with the result that when the two cylindrical portions are registered together, with their free ends in alignment, the annular portion 6 of the ring 4 projects outwardly adjacent the center of the cylindrical portion 2 of the ring 1.

Bonded to the rings 1 and 4 is an elastomer sealing element consisting of an annular portion 7 bonded to the outer surface of the annular portion 6 of the ring 4 and to the outer surface of the cylindrical portion 2 of the ring 1 adjacent the junction of the cylindrical and annular portions of that ring.

It will be noted that the outer surface 8 of the annular portion 7 of the elastomer lies in a plane disposed in juxtaposition to the outer surface of the annular portion 3 of the ring 1.

Integral with the annular portion 7 of the elastomer is a generally cylindrical portion 9, and the outer edge of the annular wall 6 is embedded in the elastomer adjacent the junction of the annular and generally cylindrical portions thereof. The elastomer is bonded to this embedded portion of the annulus 6.

Located upon the outer surface of the generally cylindrical portion 9 of the elastomer are sealing lips 10, 11 and 12, each of which is generally triangular in cross section and projects radially outwardly from the body of the portion. It will be noted that the outermost edge of the sealing lip 12 is disposed upon a circle centered on the axis of the sealing device and having a radius greater than the radius of the circle on which lies the tip of the sealing lip 11. It will also be noted that the tip of the sealing lip 10 lies on a circle of smaller radius than the tips of lips 11 and 12. It will also be noted that in its free state the inner surface 13 of the generally cylindrical portion 9 of the elastomer is not cylindrical but rather is as a frustum of a cone whose base coincides with the inner edge of the portion 9.

Projecting radially outwardly and also axially outwardly from the junction of the portions 7 and 9 of the elastomer is a dust lip 14 whose outer edge 15 lies on a cylinder of diameter greater than the diameter of the circle on which the apex of sealing lip 12 is positioned. It will also be noted that the innermost surface 16 of the sealing lip 12 blends into the tapered end of the portion 9 of the elastomer.

As will be seen in FIG. 3, the device of the present invention is installed upon the inner cone 20 of a roller bearing, with the portion 2 of the inner metallic ring press-fitted on the outer surface of this cone and with the annular portion 3 of this ring abutted against the end of the cone. The shaft or axle 21, upon which the inner cone 20 is mounted, has a shoulder 22 that abuts against the outer surface of the metal annulus 3 to definitely position the cone 20 with respect to the shaft 21. The generally cylindrical portion 9 of the elastomer is distorted by engagement with the bore 23 in the machine part 24, forcing the sealing lips 10, 11 and 12 into seal-forming engagement with that bore. The dust lip 14 is likewise distorted to form a tight seal with the bore and thereby prevent entrance of extraneous matter into the lubricant space. The outer cone 25 of the bearing fits into the bore in the housing 24 and it will be noted that the inclined surface 16 of the elastomer element is spaced a short distance from the outer edge of the cone 25.

Preferably prior to assembly of the bearing and sealing device in the bore 23, a lubricant is placed in the channels between dust seal 14 and sealing lips 10, 11 and 12.

It frequently happens that service men, in filling the lubricant space in the device of the kind with which this invention is used, will be over-ambitious and will over-fill this space, sometimes forcing grease therein under considerable pressure. The pressure thus built up in the lubricant space bears against the cylindrical wall 6 of the outer metallic ring which prevents this pressure from distorting the annular portion 7 of the elastomer. This pressure also bears against the inner surface 13 of the generally cylindrical portion 9 of the elastomer and serves to force the sealing lips 10, 11 and 12 into tighter engagement with the bore. In instances where the overloading of the space with lubricant is sufficiently great, lubricant bearing against the inclined surface 16 tends to lift that surface away from the bore and the seal is thereby aided in purging itself of excess grease.

From the foregoing, it will be apparent that the device of the present invention provides a seal which can be mounted upon the inner cone of a roller bearing and which has a plurality of sealing lips engaging the bore to effectively maintain the lubricant sealed in the desired space under adverse conditions. The dust lip 14 protects the bearing from entrance of dirt and other extraneous matter into the lubricant by which the bearing is lubricated. Long life of the bearing and sealing device are thus assured.

The device of the present invention is economical to manufacture without sacrificing quality.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claim.

What I claim is:

A device for mounting upon the inner cone of a roller bearing and forming a seal with a bore adjacent the outer cone of the bearing, comprising a first metallic ring consisting of a cylindrical portion and an annular portion extending radially inwardly from one end of the cylindrical portion;

a second metallic ring consisting of a cylindrical portion and an annular portion extending radially outwardly from one end of the cylindrical portion and terminating on a circle of diameter substantially less than the diameter of the bore;

said rings being fixed together with the cylindrical portions engaged, with the ends of said portions remote from said annuli aligned, and with the annular portion of the second ring offset axially from the annular portion of the first ring toward said aligned ends;

an elastomer annulus bonded to the face of the annulus of the second ring remote from said aligned ends and to the cylindrical portion of the first ring disposed between said annuli;

a generally cylindrical portion integral with said elastomer annulus and extending across the terminal end of said second annulus and axially beyond a plane through said aligned ends;

and a plurality of spaced apart sealing lips projecting radially outwardly from said generally cylindrical elastomer portion, which lips define radially outwardly opening grooves adapted to receive a lubricant for the lips.

References Cited in the file of this patent

UNITED STATES PATENTS

| | | |
|---|---|---|
| 2,089,963 | Johnson | Aug. 17, 1937 |
| 2,165,155 | Schmal | July 4, 1939 |
| 2,235,735 | Bernstein | Mar. 18, 1941 |
| 2,249,141 | Johnson | July 15, 1941 |
| 2,443,332 | Summer | June 15, 1948 |
| 2,451,269 | Allen et al. | Oct. 12, 1948 |
| 2,834,616 | Gebert et al. | May 13, 1958 |
| 2,878,084 | Bermingham | Mar. 17, 1959 |
| 2,966,376 | Reynolds | Dec. 27, 1960 |

FOREIGN PATENTS

| | | |
|---|---|---|
| 727,814 | Great Britain | Apr. 6, 1955 |